United States Patent
Fujiwara et al.

(10) Patent No.: US 7,545,459 B2
(45) Date of Patent: Jun. 9, 2009

(54) FLAT DISPLAY APPARATUS WITH SPEAKER FUNCTION

(75) Inventors: Atsushi Fujiwara, Ome (JP); Yukihiro Matsui, Takasaki (JP); Hisayoshi Matsui, Agatsuma-gun (JP); Fumihisa Ito, Tomioka (JP)

(73) Assignees: Casio Computer Co., Ltd., Tokyo (JP); Taiyo Yuden Co., Ltd., Tokyo (JP)

( * ) Notice: Subject to any disclaimer, the term of this patent is extended or adjusted under 35 U.S.C. 154(b) by 230 days.

(21) Appl. No.: 11/634,401

(22) Filed: Dec. 6, 2006

(65) Prior Publication Data
US 2007/0132911 A1    Jun. 14, 2007

(30) Foreign Application Priority Data
Dec. 9, 2005    (JP)    ............................. 2005-356383

(51) Int. Cl.
*G02F 1/1333*    (2006.01)
(52) U.S. Cl. ........................................ 349/58; 362/632
(58) Field of Classification Search ............ 349/58, 349/60, 65; 353/119; 362/632
See application file for complete search history.

(56) References Cited

U.S. PATENT DOCUMENTS

| 7,397,520 B2* | 7/2008 | Kobayashi et al. ............ 349/58 |
| 2005/0129261 A1* | 6/2005 | Ito et al. ...................... 381/190 |

FOREIGN PATENT DOCUMENTS

JP    2004-335293 A    11/2004

* cited by examiner

*Primary Examiner*—Thoi V Duong
(74) *Attorney, Agent, or Firm*—Frishauf, Holtz, Goodman & Chick, P.C.

(57) ABSTRACT

A display apparatus includes a flat display panel, and a housing which surrounds the display panel. The housing includes a backboard portion facing the display panel and a sound emitting portion. A vibrating plate is arranged in a region corresponding to the sound emitting portion between the display panel and the backboard portion of the housing. A first spacer is attached to a rim portion of one surface of the vibrating plate, the first spacer being interposed between the vibrating plate and one of the backboard portion of the housing and the display panel. A second spacer is attached to a rim portion of the other surface of the vibrating plate, the second spacer being interposed between vibrating plate and the other of the backboard portion of the housing and the display panel. The first and second spacers are made of materials having different degree of hardness.

10 Claims, 2 Drawing Sheets

FLAT DISPLAY APPARATUS WITH SPEAKER FUNCTION

CROSS-REFERENCE TO RELATED APPLICATIONS

This application is based upon and claims the benefit of priority from prior Japanese Patent Application No. 2005-356383, filed Dec. 9, 2005, the entire contents of which are incorporated herein by reference.

BACKGROUND OF THE INVENTION

1. Field of the Invention

The present invention relates to a flat display apparatus with a speaker function.

2. Description of the Related Art

As a display apparatus provided with a speaker function, there is known a display apparatus with a speaker function that includes a flat display panel such as a liquid crystal display panel or an electroluminescent display panel and a sound generator arranged on the opposite side to the viewing side of this display panel to reduce the size and thickness of an electronic device on which the display panel is mounted.

This display apparatus with a speaker function has a structure in which a display element portion having a display element frame supporting the flat display panel, and a sound generator having a sound generator frame supporting the sound generator on the rear surface (the surface on the opposite side to the viewing side) are arranged as disclosed in Jpn. Pat. Appln. KOKAI Publication No. 2004-336293.

The conventional display apparatus has a problem in that the volume of sound generated by the speaker is low.

BRIEF SUMMARY OF THE INVENTION

It is an object of the present invention to provide a display apparatus with a speaker function capable of sufficiently increasing speaker sound volume in the display apparatus in which a sound generating vibrating element is arranged on the opposite side to the viewing side of an image display panel to constitute a speaker.

To achieve this object, there is provided a display apparatus comprising:

a flat display panel which has a surface on a viewing side, a rear surface on an opposite side of the surface on the viewing side, and a side surface;

a housing which has a circumferential wall portion surrounding the side surface of the display panel, an opening portion corresponding to the viewing-side surface of the display panel, a backboard portion facing the rear surface of the display panel and a sound emitting portion, and accommodates the display panel therein;

a plate-like vibrating element arranged in a region corresponding to the sound emitting portion between the rear surface of the display panel and the backboard portion of the housing;

a first spacer which is formed into a shape parallel to a rim portion of the vibrating element by a material having a first degree of hardness, the first spacer being interposed between the rim portion of one surface of the vibrating element and one of the backboard portion of the housing and the rear surface of the display panel to support the rim portion of the vibrating element; and a second spacer which is formed into a shape parallel to the rim portion of the vibrating element by a material having a second degree of hardness different from the first degree of hardness, the second spacer being interposed between the rim portion of the other surface of the vibrating element and the other of the backboard portion of the housing and the rear surface of the display panel.

According to the display apparatus of the present invention, since the vibrating element is supported to be held between two spacers having different degrees of hardness, the vibrating element can be vibrated with a large amplification with a rim portion of the vibrating element supported by these spacers being determined as a node of vibration, and sound with a large acoustic pressure can be generated from the vibrating element.

In this display apparatus, it is preferable that the first spacer is formed of a ring-like spacer formed into a ring-like shape with a material having a first degree of hardness higher than a second degree of the second spacer and secured to the rim portion of one surface of the vibrating element. In this case, it is desirable that one surface of the first spacer is secured to the rim portion of the one surface of the vibrating element and the other surface of the same is secured to one of a backboard portion of a housing and a rear surface of a display panel.

Further, in this display apparatus, it is preferable that the second spacer is formed of a material having the second degree of hardness lower than the first degree of hardness of the first spacer, and a space surrounded by the second spacer and a sound emitting portion of the housing communicating with this space form a sound leading space through which generated sound from the vibrating element is led. In this case, it is desirable that the second spacer is formed of a C-ring-shaped spacer having a notch portion that allows the inside to communicate with the outside being partially provided therein, and the notch portion is arranged to face the sound emitting portion of the housing.

Furthermore, in this display apparatus, it is preferable that the first spacer is formed of a material having the first degree of hardness higher than the second degree of hardness of the second spacer and interposed between the vibrating element and the backboard portion of the housing, and that the second spacer is formed of a material having the second degree of hardness lower than the first degree of hardness of the first spacer and interposed between the vibrating element and the rear surface of the display panel. In this case, it is desirable that the first spacer is formed of a ring-like spacer secured to the rim portion of one surface of the vibrating element and the backboard portion of the housing, and the second spacer is formed of a C-ring-like spacer having the notch portion that allows the inside to communicate with the outside being partially formed therein, the space surrounded by the second spacer and the sound emitting portion of the housing communicating with this space form the sound leading space through which generated sound from the vibrating element is led by arranging the notch part to face the sound emitting portion of the housing.

Moreover, in this display apparatus, it is preferable that the first spacer is made of a resin having a Young's modulus of $0.4 \times 10^9$ to $0.5 \times 10^{10}$ Pa. Alternatively, it is preferable that the first spacer is made of a metal having a Young's modulus of $5.0 \times 10^{10}$ to $60 \times 10^{10}$ Pa. Additionally, the second spacer is preferably made of a resin having a Young's modulus of $1.0 \times 10^6$ to $10 \times 10^6$ Pa.

DETAILED DESCRIPTION OF THE INVENTION

Figure 1:
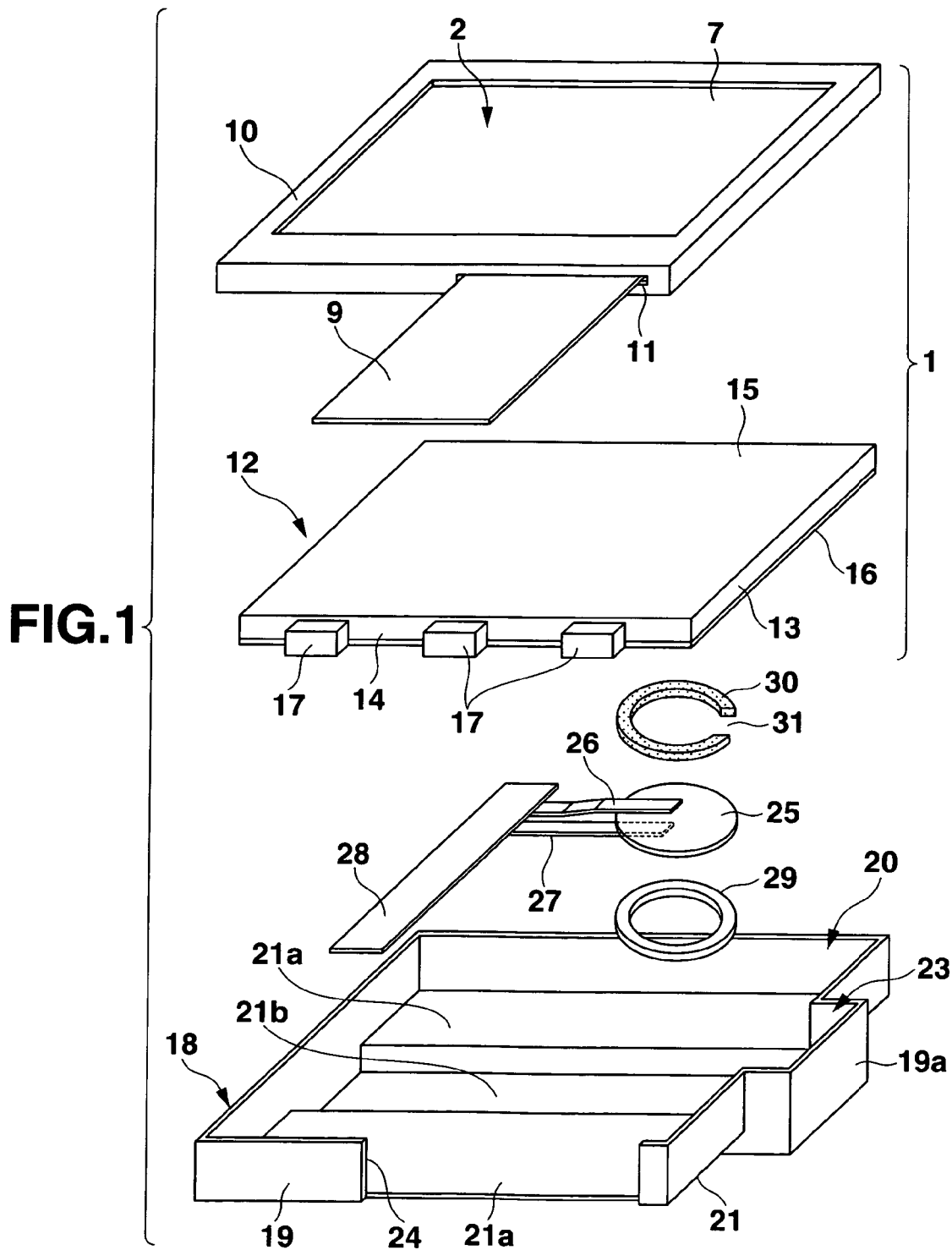
FIG. 1 is an exploded perspective view of a display apparatus depicting an embodiment of the present invention.
Figure 2:
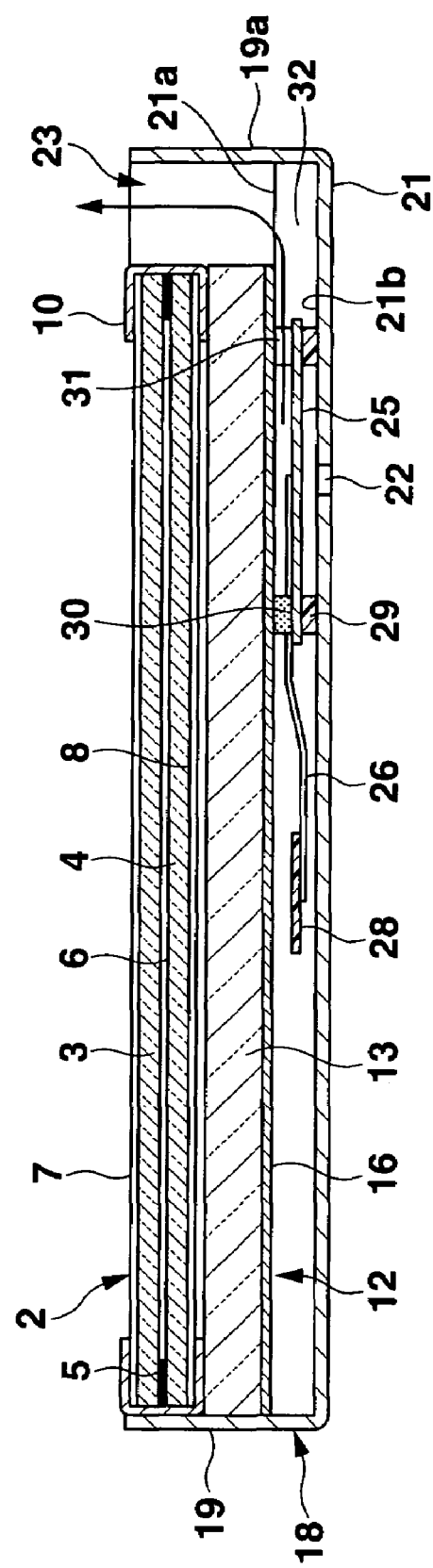
FIG. 2 is a cross-sectional view of the display apparatus depicted in FIG. 1.

FIGS. 1 and 2 show an embodiment according to the present invention, wherein FIG. 1 is an exploded perspective view of a display apparatus, and FIG. 2 is a cross-sectional view of the display apparatus.

As shown in FIGS. 1 and 2, this display apparatus includes a flat display panel 1, a housing 18 accommodating the display panel 1, and a speaker unit or assembly arranged between the display panel 1 and a bottom wall or a backboard portion 21 of the housing 18. The housing 18 has a rectangular circumferential wall portion 19 surrounding an outer side periphery of the display panel 1, a rectangular opening portion 20 corresponding to a front face of the display panel 1 on the viewing side, the backboard portion 21 facing a rear surface of the display panel 1 on the opposite side of the display side, and a sound emitting portion 23. The speaker unit includes a thin-plate-like vibrating element 25 arranged in a region corresponding to the sound emitting portion 23 between the rear surface of the display panel 1 and the backboard portion 21 of the housing 18. First and second spacers 29 and 30 are formed into shapes parallel with a rim portion of the vibrating element 25 and arranged to interpose the vibrating plate 25 therebetween.

The display panel 1 has, e.g., a liquid crystal display panel 2, and a surface light source 12 that is arranged on the opposite side to the viewing side of this liquid crystal display panel 2 and emits illumination light toward the liquid crystal display panel 2. The liquid crystal display panel 2 includes a pair of transparent substrates 3 and 4 having a plurality of transparent electrodes (not shown) that use opposed regions to form a plurality of pixels arranged in a matrix form on opposed inner surfaces thereof, a frame-like sealing material 5 that bonds the pair of transparent substrates 3 and 4 at their peripheries, a liquid crystal layer 6 arranged in a region surrounded by the sealing frame 5 between the pair of substrates 3 and 4, and polarizing plates 7 and 8 arranged on respective outer surfaces of the pair of substrates 3 and 4. The liquid crystal display panel applies a voltage to a space between electrodes of the respective pixels to control an alignment state of liquid crystal molecules, thereby displaying an image.

In this liquid crystal display panel 2, a plurality of pixel electrodes arranged in a matrix form along row and column directions, a plurality of thin-film transistors (TFTs) respectively connected with these pixel electrodes, a plurality of gate wiring lines that supply gate signals to the TFTs in the respective rows, and a plurality of data wiring lines that supply data signals to the TFTs in the respective columns are provided on an inner surface of the substrate 4 on, e.g., the opposite side to the viewing side. As the other transparent electrode, a single-film-like opposed electrode facing the entire region where the plurality of pixel electrodes are arranged is provided on a side of an inner surface of the substrate 3 on the viewing side. This liquid crystal display panel constitutes an active matrix display panel, and the plurality of gate wiring lines and data wiring lines are led to a bulge portion formed at a side edge portion of the substrate 4 on the opposite side and connected with a gate driver and a data river mounted on the bulge portion.

Further, the liquid crystal display panel 2 includes color filters having three colors, i.e., red, green, and blue respectively provided in accordance with the plurality of pixels, these color filters are provided on the inner surface of the viewing-side substrate 3, and the opposed electrode is formed on the color filters.

Alignment films are provided on a side of the inner surfaces of the pair of substrates 3 and 4 to cover the opposed electrode and the plurality of pixel electrodes.

This liquid crystal display panel 2 may be of one of a TN or STN type having twist-aligned liquid crystal molecules in the liquid crystal layer 6, a homeotropic alignment type having liquid crystal molecules substantially homeotropically aligned with respect to the surfaces of the substrates 3 and 4, a homogeneous alignment type having liquid crystal molecules substantially homogeneously aligned with respect to the surfaces of the substrates 3 and 4 without being twisted, and a bend alignment type having bend-aligned liquid crystal molecules, or it may be a ferroelectric or antiferroelectric liquid crystal display panel.

The liquid crystal display panel 2 is not restricted to a structure in which electrodes using opposed regions to form a plurality of pixels are respectively provided on the inner surfaces of the pair of substrates 3 and 4, and it may have a transverse electric field control type structure in which a first and a second electrode (e.g., a comb-like signal electrode having a plurality of comb tooth portions and a common electrode corresponding to spaces between the respective comb tooth portions of the signal electrode) forming a plurality of pixel regions are provided on the inner surface of one substrate and a transverse electric field along the substrate surfaces are applied to the space between these electrodes to control an alignment state of liquid crystal molecules.

A flexible wiring substrate 9 which connects the gate driver and the data driver to a non-illustrated display drive control circuit is connected with the bulge portion of the substrate 4 on the opposite side of the liquid crystal display panel 2.

The liquid crystal display panel 2 is supported in a display panel support frame 10 that holds a rim portion of the liquid crystal display panel 2. The flexible wiring substrate 9 is drawn to the outside of the support frame 10 via a slit portion 11 provided in a side wall of the support frame 10.

The surface light source 12 is constituted of a light guiding plate 13 formed of a rectangular tabular transparent member, and a plurality of light-emitting elements 17 formed of a plurality of light-emitting diodes (LEDs) or the like arranged to face one facet of the light guiding plate 13. The plurality of light-emitting elements 17 are arranged on one facet of the light guiding plate 13, and an incidence facet 14 from which light from the light-emitting elements 17 enters is formed. An exit surface 15 for light which enters from the incidence facet 14 is formed on one of two plate surfaces, and a reflection surface that reflects the light entering from the incidence facet 14 toward the exit surface 15 is formed on the other plate surface. A reflection film 16 is provided on an outer side of this reflection surface.

An outer surface of a rim (three facets) of the light guiding plate 13 except the incidence facet 14 thereof corresponds to an inner surface of the rim of the display panel support frame 10, and the incidence facet 14 has a flat shape having a gap formed between itself and one facet of the display panel support frame 10. The plurality of light-emitting elements 17 are arranged in a region defined by the gap between the incidence facet 14 of the light guiding plate 13 and the facet of the display panel support frame 10, and supported by a non-illustrated support member fixed to the light guiding plate 13.

This surface light source 12 is arranged in such a manner that the exit surface 15 of the light guiding plate 13 faces the liquid crystal display panel 2 and a rim portion (a rim portion of three sides except the incidence facet 14) of the exit surface 15 of the light guiding plate 13 is in contact with the display panel support frame on the opposite side to the viewing side of the liquid crystal display panel 2.

In this embodiment, although light exiting from the exit surface 15 of the light guiding plate 13 in the surface light source 12 directly enters the liquid crystal display panel 2, a prism sheet or a diffusion sheet which converts light exiting from the exit surface 15 of the light guiding plate 13 into light having a high exit light intensity in a front surface direction and a uniform intensity distribution to enter the liquid crystal display panel 2 may be arranged between the exit surface 15 of the light guiding plate 13 and the liquid crystal display panel 2.

The housing 18 is formed of a thin-box-like metallic case, and a sound emitting portion 23 from which generated sound from the vibrating element 25 is emitted to the outside of the housing 18 is provided at a predetermined part of a circumferential wall portion 19 of the housing 18. Further, a wiring substrate pullout portion 24 is provided at a part of a remaining portion of the circumferential wall portion 19 of the housing 18.

The circumferential wall portion 19 of the housing 18 is formed into a shape that is in contact with an outer peripheral surface of the display panel 1, i.e., an outer peripheral surface of the display panel support frame 10 and an outer peripheral surface of three sides of the light guiding plate 13 except the incidence facet 14 in the surface light source 12 with no space along an entire circumference except a part where the sound emitting portion 23 and the wiring substrate pullout portion 24 are provided.

In this embodiment, a protruding wall portion 19a of a generally U-shape protruding outwards is formed at a central part of one side portion of the circumferential wall portion 19 of the housing 18, and the sound emitting portion 23 that is surrounded by the protruding wall portion 19a, the surface light source and one outer facet of the display panel 1 and opened to the outside of the housing 18 on the opening portion 20 side of the housing 18 is formed at this part. The other side of the circumferential wall portion 19 is partially notched to form the wiring substrate pullout portion 24.

A groove-like concave portion in which a part corresponding to the sound emitting portion 23 protrudes outwardly (downwardly) over the entire length (the entire length in the lateral direction in FIG. 1) including this part is formed in the backboard portion 21 of the housing 18 at a central part corresponding to the sound emitting portion 23. Inner surfaces on both side portions sandwiching this concave portion form display panel support surfaces 21a, and an inner bottom surface of the concave portion forms a vibrating element support surface 21b.

A height of a step between each display panel support surface 21a and the vibrating element support surface 21b is set to be substantially the same as a total thickness of the vibrating element 25 and the first and the second spacers 29 and 30. A port 22 is provided in the vibrating element support surface 21b in a region close to the sound emitting portion 23. The port is opened to the outer surface of the backboard portion 21 and preferably has a circular shape.

The display panel 1 is accommodated in the housing 18 with the viewing-side surface of the liquid crystal display panel 2 facing the opening portion 20 of the housing 18, and the flexible wiring substrate 9 is pulled to the outside of the housing 18 from the wiring substrate pullout portion 24 of the housing 18. The display panel support frame 10 is fixed on the circumferential wall portion 19 of the housing 18 by attaching means (not shown) such as screwing in a state where the surface of the surface light source 12 having the reflection film 16 of the light guiding plate 13 provided thereon is supported on the display panel support surface 21a of the backboard portion 21 of the housing 18.

Although the vibrating element or plate 25 is illustrated as a single thin film shape in the figure, it is a piezoelectric vibrating element having a circular piezoelectric film attached to one surface of a circular vibrating plate. Two thin-film leads 26 and 27 respectively connected with two electrodes of the piezoelectric element are soldered to the flexible wiring substrate 28 that connects the vibrating element 25 to a non-illustrated vibrating element drive circuit.

The vibrating element 25 is arranged in such a manner that one surface of the vibrating plate 25 faces the backboard portion 21 of the housing 18 in a region close to the sound emitting portion 23 between the rear surface of the display panel 1 accommodated in the housing 18 and the vibrating element support surface 21b of the backboard portion 21 of the housing 18, the other surface faces the rear surface of the display panel 1, and a central part of the vibrating plate 25 corresponds to the port 22 provided in the vibrating element support surface 21b. The flexible wiring substrate 28 connected to the vibrating element 25 is pulled to the outside of the housing 18 from the cutout portion 24 of the housing 18.

Of the first and the second spacers 29 and 30 arranged to sandwich the vibrating plate 25 therebetween, the first spacer 29 has a first degree of hardness higher than a counterpart of the second spacer 30. The first spacer 29 is formed into a continuous ring-like shape along an entire circumference of the rim portion of the vibrating circle plate 25. The second spacer 30 having a second degree of hardness lower than the first degree of hardness is formed into a C-ring-like shape having a notch portion 31 that allows the inside and the outside of the spacer 30 to communicate being provided at a part thereof, which is preferably a side facing the sound emitting portion 23.

The first spacer 29 will be referred to as a ring-like spacer and the second spacer 30 will be referred to as a C-ring-like spacer hereinafter.

The ring-like spacer 29 having the high degree of hardness is preferably made of a resin having a Young's modulus of $0.4 \times 10^9$ to $0.5 \times 10^{10}$ Pa, e.g., polyethylene, polystyrene, polypropylene, polycarbonate, an acrylic resin, an acrylonitrile butadiene styrene (ABS) resin or an acrylonitrile styrene (AS) resin, or a metal having a Young's modulus of $5.0 \times 10^{10}$ to $60 \times 10^{10}$ Pa, e.g., aluminum, stainless steel, cold-rolled steel or galvanized steel.

The C-ring-like spacer 30 having the low degree of hardness is preferably made of a resin having a Young's modulus of $1.0 \times 10^6$ to $10 \times 10^6$ Pa, e.g., polyurethane, a butyl resin or a silicone resin. These resins are rubber resins, and hence the spacer 30 having the low degree of hardness has elasticity and buffering properties.

The first spacer 29 having the high degree of hardness is interposed between the rim portion of one surface (the surface facing the backboard portion 21 of the housing 18) of the vibrating element 25 and the vibrating element support surface 21b of the backboard portion 21 of the housing 18, and firmly supports the rim portion of the vibrating element 25 as a portion corresponding to a node of vibration.

One surface of this spacer 29 having the high degree of hardness is secured to the rim portion of the one surface of the vibrating element 25 through an adhesive or a double-sided adhesive tape. The other surface of the same is secured to the vibrating element support surface 21b of the backboard portion 21 of the housing 18 through an adhesive or a double-sided adhesive tape, thereby firmly fixing the rim portion of the vibrating element 25 to the backboard portion 21 of the housing 18.

The C-ring-like spacer 30 having the low degree of hardness is arranged between the other surface of the vibrating element 25 (the surface facing the rear surface of the display panel 1) and the rear surface of the display panel 1 (the surface of the surface light source 12 having the reflection film 16 of the light guiding plate 13 provided thereon) in such a manner that the notch portion 31 thereof preferably faces the sound emitting portion 23 of the housing 18. Furthermore, a circle space surrounded by the second spacer 30 between the other surface of the vibrating element 25 and the rear surface of the display panel 1 and the sound emitting portion 23 in the housing 18 that communicates through the notch portion 31 of the spacer 30 form the sound leading space 32. Sound generated from the vibrating element 25 is emitted toward the viewing side of the display apparatus through the sound leading space 32.

One surface of the second spacer 30 having the low degree of hardness is secured to the rim portion of the other surface of the vibrating circle plate 25 via an adhesive or a double-sided adhesive tape, and the other surface of this spacer 30 is in close contact with the rear surface of the display panel 1.

Since the second spacer 30 having the low degree of hardness has elasticity, it may be arranged in such a manner that both surfaces thereof are in close contact with the rim portion of the other surface of the vibrating element 25 and the rear surface of the display panel 1. In such a case, this spacer 30 is not displaced or moved in vain.

That is, according to this display apparatus, the flat display panel 1 is accommodated in the housing 18 having the sound emitting portion 23 provided at a predetermined part of the circumferential wall portion 19 surrounding the display panel 1, and the thin-plate-like vibrating element 25 is sandwiched between the ring-like spacer 29 and the C-ring-like spacer 30 in a region corresponding to the sound emitting portion 23 between the rear surface of the display panel 1 and the front surface of the rear board portion 21 of the housing 18. Moreover, of these spacers 29 and 30, the ring-like spacer 29 having the high degree of hardness is interposed between the rim portion of one surface of the vibrating element 25 and the backboard portion 21 of the housing 18 to support the rim portion of the vibrating plate 25, and the C-ring-like spacer 30 having the low degree of hardness is interposed between the rim portion of the other surface of the vibrating element 25 and the rear surface of the display panel 1 in such a manner that the notch portion 31 thereof faces the sound emitting portion 23 of the housing 18. As a result, the space surrounded by the C-ring-like spacer 30 having the low degree of hardness between the other surface of the vibrating plate 25 and the rear surface of the display panel 1 and the sound emitting portion 23 of the housing 18 that transmits generated sound from the vibrating element 25 to the notch portion 31 of the C-ring-like spacer 30 form together the sound leading space 32, thereby constituting a speaker that emits generated sound from the vibrating element 25 to the outside through the sound emitting portion 23.

According to this display apparatus, the flat image display panel 1 is accommodated in the housing 18 having the sound emitting portion 23, and the thin-plate-like vibrating element 25 is arranged between the rear surface of the display panel 1 and the backboard portion 21 of the housing 18. Therefore, an area of the entire display apparatus can be reduced to be substantially equal to that of the display panel 1, and a thickness of the entire display apparatus can be reduced. Accordingly, when this display apparatus is mounted on an electronic device such as a digital camera, a mobile phone, a personal digital assistant (PDA) or a video camera, the electronic device can be reduced in size and thickness.

Additionally, according to this display apparatus, the vibrating element 25 is held and arranged between the first and second spacers 29 and 30 having the different degrees of hardness each having a shape parallel to the rim portion of the vibrating plate 25. Of these spacers 29 and 30, the ring-like spacer 29 having the high degree of hardness is interposed between the rim portion of one surface of the vibrating plate 25 and the backboard portion 21 of the housing 18 to support the rim portion of the vibrating element 25. Therefore, the rim portion of the vibrating element 25 can be firmly supported, and the vibrating element 25 can be vibrated with large amplitude with its part at the rim portion supported by the ring-like spacer 29 having the high degree of hardness being determined as a node of vibration. Thus, sound having a high acoustic pressure can be generated from the vibrating element 25.

The space surrounded by the ring-like spacer 29 between one surface of the vibrating element 25 and the backboard portion 21 of the housing 18 communicates with the outside of the housing 18 through the port 22 provided in the backboard portion 21 of the housing 18, and the space surrounded by the C-ring-like spacer 30 between the other surface of the vibrating element 25 and the rear surface of the display panel 1 communicates with the sound emitting portion 23 of the housing 18 at the notch portion 31 of the second spacer 30, thereby freely vibrating the vibrating element 25.

Further, in this display apparatus, the C-ring-like spacer 30 having the low degree of hardness is interposed between the rim portion of the other surface of the vibrating element 25 and the rear surface of the display panel 1 in such a manner that the notch portion 31 thereof faces the sound emitting portion 23 of the housing 18. Therefore, sound insulating properties from the space surrounded by the C-ring-like spacer 30 are improved, and generated sound from the vibrating element 25 can be intensively emitted to the outside through the sound emitting portion 23 of the housing 18 without leakage.

Accordingly, this display apparatus can sufficiently increase sound volume of the speaker constituted by arranging the vibrating element 25 on the opposite side to the viewing side of the flat image display panel 1.

Sound generated by vibration of the vibrating element 25 on the space side surrounded by the ring-like spacer 29 is emitted to the outside of the housing 18 through the port 22 provided in the backboard portion 21 of the housing 18, and absorbed by a non-illustrated member arranged at the periphery of the port 22 in the electronic device.

Furthermore, in this display apparatus, the rim portion of one surface of the vibrating element 25 is secured to the backboard portion 21 of the housing 18 by using the ring-like spacer 29. Therefore, the entire rim portion of the vibrating element 25 can be further firmly supported, thus vibrating the vibrating element 25 with a large amplification.

Moreover, in this display apparatus, since the ring-like spacer 29 having the high degree of hardness is interposed between the vibrating element 25 and the backboard portion 21 of the housing 18, the rim portion of the vibrating element 25 can be further firmly supported, thereby vibrating the vibrating element 25 with large amplitude.

As the ring-like spacer 29 having the high degree of hardness, one formed of a resin having a Young's modulus of $0.4 \times 10^9$ to $0.5 \times 10^{10}$ Pa is preferable as described above. Using the spacer 29 made of a resin having such a Young's modulus enables supporting the rim portion of the vibrating element 25 with sufficient rigidity, thus vibrating the vibrating element 25 with large to generate sound having a high acoustic pressure.

As the ring-like spacer 29 having the high degree of hardness, one made of a metal having a Young's modulus of $5.0\times10^{10}$ to $60\times10^{10}$ Pa is preferable as described above. Using the spacer 29 made of a metal having such a Young's modulus enables supporting the rim portion of the vibrating element 25 with higher rigidity, thus vibrating the vibrating element 25 with large amplitude.

Additionally, in this display apparatus, since the C-ring-like spacer 30 having the low degree of hardness is interposed between the vibrating element 25 and the rear surface of the display panel 1, the C-ring-like spacer 30 having the low degree of hardness can effectively attenuate vibration transmitted to the display panel 1 from the vibrating element 25, thereby preventing vibration of the vibrating element 25 from adversely affecting the display panel 1.

As the C-ring-like spacer 30 having the low degree of hardness, one made of a resin having a Young modulus of $1.0\times10^6$ to $10\times10^6$ Pa is preferable as described above. Using the spacer 30 made of a resin having such a Young's modulus can sufficiently enhance sound insulating properties of the circumferential wall of the sound leading space 32, emit generated sound from the vibrating element 25 to the outside via the sound emitting portion 23 of the housing 13 to further increase speaker sound volume, and sufficiently attenuate vibration transmitted to the display panel 1 from the vibrating element 25.

According to the foregoing embodiment, of the first and second spacers 29 and 30, the first spacer 29 having the high degree of hardness is interposed between the vibrating element 25 and the backboard portion 21 of the housing 18, whilst the second spacer 30 having the low degree of hardness is interposed between the vibrating element 25 and the rear surface of the display panel 1. In contrast, the first spacer 29 having the high degree of hardness may be interposed between the vibrating element 25 and the other rear surface of the display panel 1 to support the rim portion of the vibrating element 25, and the second spacer 30 having the low degree of hardness may be interposed between the vibrating element 25 and the backboard portion 21 of the housing 18 to form the sound leading space. When this structure is adopted, speaker sound volume can be likewise sufficiently increased.

Further, according to the foregoing embodiment, the protruding wall portion 19a is formed on the circumferential wall portion 19 of the housing 18, and the sound emitting portion 23 is formed at this part. However, the sound emitting portion 23 may be formed by providing, e.g., a sound emitting hole in the circumferential wall portion 19.

Furthermore, according to the foregoing embodiment, the groove-like concave portion is formed at the part of the housing 18 corresponding to the sound emitting portion 23 of the backboard portion 21 over the entire length including the part corresponding to the sound emitting portion 23. However, this concave portion may be formed only in a region extending from the part corresponding to the sound emitting portion 23 to the portion where the vibrating element 25 is arranged.

Moreover, the display apparatus according to the foregoing embodiment comprises the display panel 1 including the liquid crystal display panel 2 and the surface light source 12, but the display panel 1 may include a self-luminous type display panel such as an electroluminescent display panel.

What is claimed is:

1. A display apparatus comprising:
   a flat display panel which has a surface on a viewing side, a rear surface on an opposite side of the surface on the viewing side, and a side surface;
   a housing which has a circumferential wall portion surrounding the side surface of the display panel, an opening portion corresponding to the viewing-side surface of the display panel, a backboard portion facing the rear surface of the display panel and a sound emitting portion, and accommodates the display panel therein;
   a vibrating element arranged in a region corresponding to the sound emitting portion between the rear surface of the display panel and the backboard portion of the housing;
   a first spacer which is formed into a shape parallel to a rim portion of the vibrating element and which is made of a material having a first degree of hardness, the first spacer being interposed between the rim portion of a first surface of the vibrating element and the backboard portion of the housing to support the rim portion of the vibrating element; and
   a second spacer which is formed into a shape parallel to the rim portion of the vibrating element and which is made of a material having a second degree of hardness lower than the first degree of hardness, the second spacer being interposed between the rim portion of a second surface of the vibrating element and the rear surface of the display panel.

2. The display apparatus according to claim 1, wherein the first spacer includes an annular spacer and is secured to the rim portion of the first surface of the vibrating element.

3. The display apparatus according to claim 2, wherein one surface of the first spacer is secured to the rim portion of the first surface of the vibrating element, and an opposite surface of the first spacer is secured to the backboard portion of the housing.

4. The display apparatus according to claim 1, wherein a space surrounded by the second spacer and the sound emitting portion of the housing communicating with the space form a sound leading space through which generated sound from the vibrating element is led.

5. The display apparatus according to claim 4, wherein the second spacer includes a shaped spacer having a notch portion arranged to face the sound emitting portion of the housing.

6. The display apparatus according to claim 1, wherein the first spacer is annular and is secured to the rim portion of the first surface of the vibrating element and the backboard portion of the housing, and the second spacer includes a C-shaped spacer having a notch portion and a space surrounded by the second spacer and the sound emitting portion of the housing communicating with the space form a sound leading space through which generated sound from the vibrating element is led when the notch portion is arranged to face the sound emitting portion of the housing.

7. The display apparatus according to claim 1, wherein the first spacer includes a resin having a Young's modulus of $0.4\times10^9$ to $0.5\times10^{10}$ Pa.

8. The display apparatus according to claim 1, wherein the first spacer includes a metal having a Young's modulus of $5.0\times10^{10}$ to $60\times10^{10}$ Pa.

9. The display apparatus according to claim 1, wherein the second spacer includes a resin having a Young's modulus of $1.0\times10^6$ to $10\times10^6$ Pa.

10. The display apparatus according to claim 1, wherein the vibrating element comprises a plate.

* * * * *